Sept. 28, 1971  A. J. TAYLOR ET AL  3,608,354
APPARATUS AND METHOD FOR DETERMINING A STRUCTURAL FAILURE
Filed Jan. 7, 1970

INVENTORS
ALBERT J. TAYLOR
VERNON M. TULL, deceased
BY GLADYS R. TULL, Executrix Kenyon & Kenyon
ATTORNEYS

United States Patent Office 3,608,354
Patented Sept. 28, 1971

3,608,354
APPARATUS AND METHOD FOR DETERMINING A STRUCTURAL FAILURE
Albert J. Taylor, Plainfield, and Vernon M. Tull, deceased, late of Edison, N.J., by Gladys R. Tull, executrix, assignors to Purolator, Inc., Rahway, N.J.
Filed Jan. 7, 1970, Ser. No. 1,210
Int. Cl. G01m 3/26
U.S. Cl. 73—37
10 Claims

ABSTRACT OF THE DISCLOSURE

Apparatus and method for determining a structural failure in an object wherein a change in fluid pressure in a pre-determined direction is sensed to indicate the failure. In a preferred embodiment, failure in the filter element of a fluid filter is determined by sensing a drop in the pressure of fluid flowed through the filter. A support is provided for a filter element and contaminated fluid is pumped from a reservoir to the filter element by means of a pump through a supply conduit. A drain conduit returns fluid from the filter to the reservoir. The pressure of the fluid before entering the filter is indicated on a suitable pressure gauge. A drop in pressure in the supply conduit is sensed by a differential pressure sensing device, having opposite sides connected to the supply conduit near the filter element support. One side of the sensing device is connected directly by a conduit to the supply conduit, while the other side is connected to the supply conduit by means of a second conduit which has unidirectional flow means interposed in the conduit. The latter means permits the free flow of fluid in a direction towards the sensing device, but resists flow of fluid in the opposite direction. Preferably, a solenoid actuated by-pass valve is provided in parallel with the aforesaid means. The sensing device is preferably a differential pressure switch which electrically controls the pump motor and solenoid valve when a pressure differential is sensed by the switch.

BACKGROUND OF THE INVENTION

It is frequently desirable to determine the pressure at which a structural failure occurs in an object. Thus, hollow objects such as containers or pipes may be subjected to fluid under pressure and the occurrence of a structural failure in a wall thereof may be indicated by a change in the pressure reading of a pressure indicating device such as a gauge.

In the application of fluid filters such as oil filters and air filters used in internal combustion engines, a certain maximum pressure differetnial between the input to and output from the filter element is specified, it being required that the differential be sustained in operation without damage to the filter material or the structure of the filter.

A method commonly used to determine the maximum presure differential before rupture in a liquid filter element involves the use of a suitable pump which feeds a housing containing the filter element to be tested. A pressure gauge is provided to read the pressure at the inlet to the housing, or a differential pressure gauge to read the differential between the inlet and outlet. Since the filter element passes the fluid wtih very little restriction, it is necessary to block the filter material to reduce the flow through it sufficiently to increase the pressure on the upstream side. This is done by adding contaminant to the fluid while it is being pumped to the element.

Upon reaching the maximum pressure which the element will withstand, the filter media will rupture or the filter element will distort permitting fluid to pass through with less restriction. The point at which this occurs is determined by an operator observing the gauge and noting a sudden drop in the pressure. If the failure is the result of the element distorting or collapsing, this point is readily determined. If, however, the failure is a small rent in the media or the opening of a small passage across the media, the pressure drop may be quite small, and as more contaminant is added, the pressure will continue to increase until a rupture occurs that will provide a definite indication. Minor pressure disturbances are indicated during the test that may be mistaken for ruptures. The test is to a large degree dependent on the skill of the operator and his familiarity with the characteristics of his test system.

Since the purpose of the filter element is to prevent passage of dirt, even the smallest rupture of the filter media is considered a failure and must be detected.

It is thus an object of the present invention to provide apparatus and method for determining a structural failure in an object which is capable of sensing minor structural failures.

It is yet another object of the present invention to provide method and apparatus for determining a rupture in a fluid filter which is sensitive to small ruptures in the filter element.

It is still another object of the present invention to provide method and apparatus for determining a rupture in a fluid filter which is automatic in operation and independent of the skill of a human operator.

SUMMARY OF THE INVENTION

In general, the apparatus of the present invention achieves these and other objects and advantages by sensing the reversal in the pressure of fluid supplied to the object. Fluid supply means are provided for supplying a fluid under pressure to the object, differential pressure sensing means are connected to said fluid supply means by first and second conduits and unidirectional fluid flow means is interposed in one of said conduits to permit flow of fluid to said pressure sensing means in one direction only. In a preferred embodiment, apparatus for determining a rupture in a fluid filter comprises a support for the fluid filter, a reservoir of contaminated fluid which is flowed through a filter supported by the support, a supply conduit connected between the reservoir and the inlet to the support, a pump interposed in the supply conduit to pump contaminated fluid to the filter support, a drain conduit connected between the support outlet and the reservoir, a differential pressure switch connected to the supply conduit between the pump and the filter support by means of two conduits connected to opposite sides of the pressure switch and a unidirectional fluid flow device interposed in one of the conduits. This device is preferably a check valve which permits flow of fluid in a direction toward the pressure switch but prevents flow in a direction away from the switch. A normally closed solenoid actuated by-pass valve is preferably provided in parallel with the check valve to permit fluid to flow around the check valve. A pressure gauge is provided to indicate the pressure of the fluid. When a rupture in a filter under test occurs a reversal in pressure will create a differential pressure across the pressure switch which causes the pump motor to stop and activates the solenoid of the by-pass valve to open it.

According to the method of the present invention contaminated fluid under pressure is flowed to a filter and a reversal in the pressure of the fluid is sensed by a differential pressure switch to indicate a rupture in the filter.

DESCRIPTION OF PREFERRED EMBODIMENT

Figure 1:
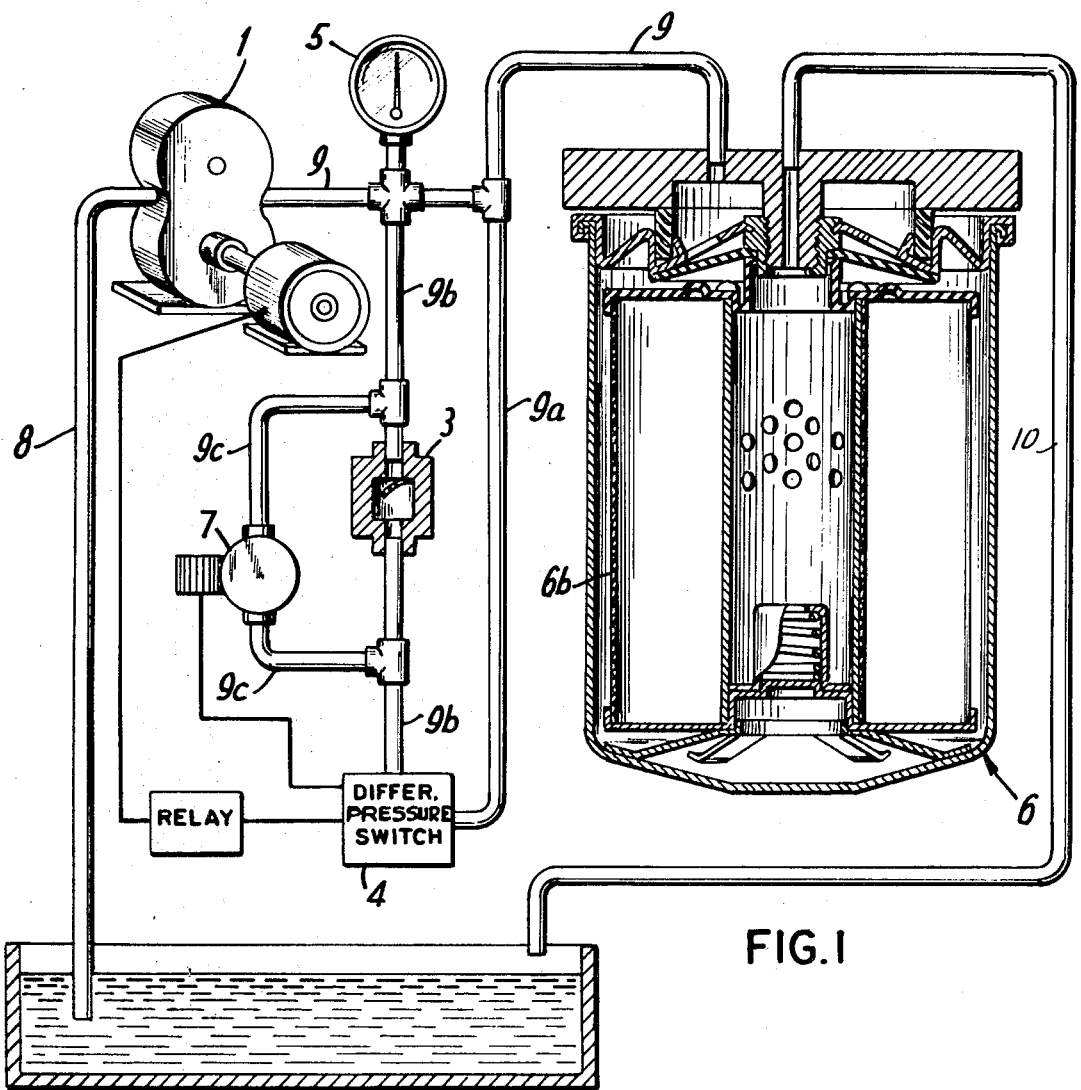
FIG. 1 is a schematic view of a preferred embodiment of the present invention.

A pump 1 is provided to take oil or other convenient testing fluid from a reservoir or sump 2 through conduit 8. Since a filter element passes the fluid with very little restriction, it is necessary to block the filter material to reduce the flow through it sufficiently to increase the pressure on the upstream side. This is done by adding contaminant to the fluid while it is being pumped to the element. The contaminat is preferably added by an automatic dispenser (not shown) during the test so that its quantity is kept fairly uniform. The fluid is then pumped by pump 1 through conduit 9 to filter support or test housing 6. Test housing 6 may be any convenient test housing containing the filter element 6a with filter material 6b to be tested.

After the fluid passes through the filter a large discharge drain conduit 10 is provided so that the pressure on the downstream side of the filter element will be virtually zero. This facilitates the measuring of the pressure differential across the filter. Since the reading on the downstream side is zero the differential can be obtained by directly reading the upstream pressure. If the downstream pressure were greater than zero, its measurement and subtraction from the upstream pressure would become necessary. While the present invention does not preclude such a system, it is preferred to keep the downstream pressure at essentially zero.

Attached to conduit 9 is a conventional follower arm gauge 5 which will indicate maximum pressure reached on the upstream side of the filter and hence the differential across the filter. Also attached to conduit 9 is a pressure differential sensing means such as differential pressure switch 4. One side of pressure switch 4 is connected directly to conduit 9. The other side of pressure switch 4 is connected to conduit 9 through a unidirectional fluid flow device such as check valve 3 which will permit flow only in one direction, to the switch 4. Check valve 3 is preferably quick acting for reasons which will become apparent below. The electrical side of the pressure switch is electrically connected to the pump motor circuit so that it will stop the pump upon actuation. A normally closed solenoid valve 7 is connected in parallel across valve 3 by means of conduit 9c so as to by-pass the check valve when energized. This valve is also electrically connected to and operated by pressure switch 4.

Figure 3:
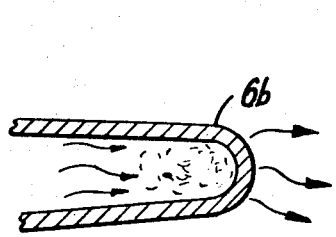
FIG. 3 is a side view of one element of the filter being fed contaminated fluid.

In operation, a filter element is placed in housing 6. Contaminated fluid is withdrawn from the sump 2 by pump 1 and pumped through conduit 9 to the test housing 6 where it flows through filter element 6a and through the conduit 10 back to the sump. Both sides of differential pressure switch 4 are connected to conduit 9 and the pressure differential across switch 4 is zero. Accordingly, the contacts of switch 4 remain closed and pump 1 continues to pump. As contaminated fluid continues to be pumped the filter element becomes blocked by the contaminant (FIG. 3) and accordingly, the pressure in conduit 9 begins to rise. As the pressure increases in conduit 9, it also increases by the same amount in the two conduits 9a and 9b leading to differential pressure switch 4. Accordingly, the differential pressure across switch 4 is still zero and the system continues to operate.

Figure 4:
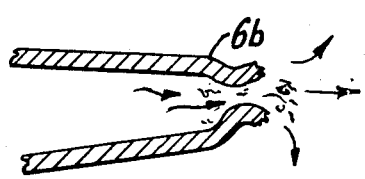
FIG. 4 is a side view of one element of the filter after the contaminated fluid has caused a rupture.
Figure 2:
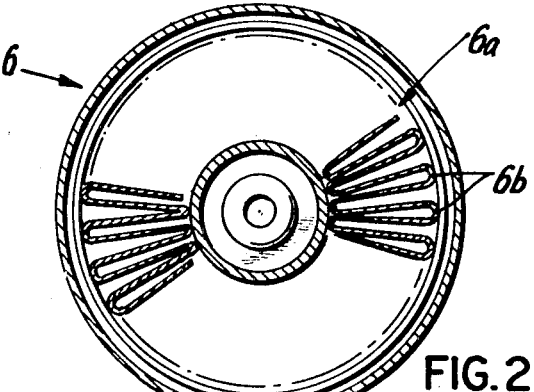
FIG. 2 is a top view of a typical filter.

When the filter element fails or ruptures (FIG. 4) the small increase in flow permitted through the rupture will result in a small pressure drop in the housing 6 and in conduit 9. While the pressure will drop in conduit 9a leading to switch 4, there will be no pressure drop in conduit 9b because of the presence of check valve 3, which only permits fluid flow toward the switch 4. Hence, there will now be a pressure differential across switch 4 which will cause its electrical contacts to open and stop the pump 1 dropping the pressure of the entire system to zero. The pressure sensed by gauge 5 will also drop to zero. However, since gauge 5 is preferably of the follower type, the maximum pressure which was reached when failure occurred will be indicated by gauge 5. After reading, the follower arm of gauge 5 is manually returned to zero.

Since check valve 3 will not permit back flow, it is necessary to provide a means to release the fluid in line 9b after failure so that the system will be ready to be used again. This is accomplished by solenoid by-pass valve 7. During operation, it is normally closed. When failure occurs, switch 4 in addition to stopping pump 1 also opens solenoid valve 7 allowing the fluid to flow back through conduit 9c. This causes the pressure on either side of switch 4 to be the same again, i.e., the differential is zero and it is ready for the next test.

What is claimed is:

1. Apparatus for determining a structural failure in an object comprising fluid supply means for supplying a fluid under pressure to an object, differential pressure sensing means connected to said fluid supply means, first conduit means for connecting one side of said sensing means to said supply means, second conduit means for connecting the other side of said sensing means to said supply means, and unidirectional fluid flow means interposed in one of said conduit means for permitting fluid flow in one direction only in said conduit means whereby a reversal in the pressure of the fluid supplied to said object is sensed by said sensing means.

2. The apparatus of claim 1 wherein said fluid supply means comprises a supply conduit and a pump interposed in said supply conduit for pumping fluid under pressure therethrough.

3. The apparatus of claim 1 wherein the object in which structural failure is to be determined is a filter element and including a support for a filter element, and wherein said fluid supply means comprises a reservoir for contaminated fluid, a supply conduit connected between said reservoir and the input to said filter element support and a pump interposed in said supply conduit for pumping contaminated fluid under pressure from said reservoir to a filter element supported by said filter element support.

4. The apparatus of claim 3 wherein said unidirectional flow means comprises a check valve which permits fluid flow only in a direction towards said pressure differential sensing means and including a normally closed by-pass valve parallelling said check valve to permit fluid flow around said check valve.

5. The apparatus of claim 4 including a pressure gauge connected to said supply conduit between said pump and said filter support to indicate the fluid pressure in said supply conduit.

6. The apparatus of claim 4 wherein said differential pressure sensing means comprises a pressure differential switch and wherein said by-pass valve comprises a solenoid actuated by-pass valve and including means for electrically connecting said pressure differential switch to said fluid pump and said solenoid actuated by-pass valve, whereby a reversal in the pressure of fluid supplied to a filter element supported by said support means caused by a structural failure of said filter element, causes a pressure differential across said pressure differential switch, thereby activating said switch to shut off said pump to stop the supply of fluid to said filter element support and to activate said solenoid actuated by-pass valve to equalize the pressure across said switch.

7. The apparatus of claim 6 including a pressure gauge connected to said supply conduit between said pump and said filter element support and a drain conduit connected between the output of said filter support and said fluid reservoir.

8. Method for determining a rupture in a fluid filter comprising the steps of flowing contaminated fluid under pressure to a filter and sensing a reversal in the pressure of the fluid flowed to the filter by means of pressure differential sensing means having a first side which is exposed to bidirectional flow of said contaminated fluid and having a second side which is exposed to unidirectional flow of said contaminated fluid.

9. The method of claim 8 including the step of terminating the flow of fluid to said fluid filter when a reversal in the pressure of said fluid is sensed.

10. The method of claim 9 including the step of indicating the pressure of said fluid flowed to said filter.

References Cited

UNITED STATES PATENTS

| | | | |
|---|---|---|---|
| 1,662,529 | 3/1928 | McKinley | 73—38 |
| 2,843,077 | 7/1958 | Leefer | 73—38X |
| 3,325,010 | 6/1967 | Sackett | 73—38X |

LOUIS R. PRINCE, Primary Examiner

W. A. HENRY II, Assistant Examiner

U.S. Cl. X.R.

73—38, 118